Nov. 13, 1928.

J. REECE ET AL 1,691,612

POWER TRANSMISSION

Filed March 25, 1925   3 Sheets-Sheet 1

John Reece &
F. A. Reece
Inventors,
by Rogers, Kennedy & Campbell,
Attorneys.

Patented Nov. 13, 1928.

1,691,612

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed March 25, 1925. Serial No. 18,115.

This invention relates to power transmission, and involves a novel method and apparatus adapted for the transmission of power for various purposes and in various situations, especially where the load is variable, or where the speed ratio is required to be altered, for example, in the case of motor vehicles.

The general object of this invention is to enable alteration of the speed ratio between the driving member or shaft and the driven member or shaft, and of the torque delivered to the latter, by gradual or continuous changes, as distinguished from step by step adjustment, and to bring about such readjustment of ratio and torque in a self acting manner determined by the existing conditions or the load on the driven shaft. Thus in the case of a motor vehicle when an increase of grade is encountered, the speed ratio and torque, with this invention, accommodate themselves to give the most effective drive, that is, the maximum driven speed consistent with the existing conditions; the driven shaft and the vehicle slowing down upon such an increase of load to an extent such that the torque delivered will propel the vehicle at the maximum speed consistent with the energy delivered by the motor and the conditions to be overcome. When the engine torque is equivalent to the driven shaft load the speed ratio will be one to one, and the mechanism will rotate as a unit without internal motion or wear; while with conditions of high load the ratio may decrease toward or substantially to zero, until the torque is able to effect the desired drive. Control by the engine throttle is additional or supplemental to the self control of this invention, and the operator can, of course, at will, increase or decrease the developed power and thus speed up or slow down the driving and driven parts as he may desire.

Transmission mechanism of the nature referred to have been disclosed in copending applications, and the present invention is in one aspect an improvement thereon, although the principles hereof may in part be embodied in other and different forms of transmission. A specific object of the present invention is to fortify or supplement the driving action at the lower ratios so as to enable a very high torque to be developed and in a wholly self acting manner, without the need of manual gear changing devices. Other and further objects and advantages of the present invention will be elucidated in the hereinafter following description of one instance or embodiment thereof, or will be apparent to those skilled in the subject matter. To the attainment of such objects and advantages the present invention consists in the novel method and apparatus for power transmission, and the novel features of combination, arrangement, structure and detail herein described or illustrated.

In the accompanying drawings Fig. 1 is substantially a central longitudinal section view of one form or embodiment of a transmission apparatus utilizing the principles of the present invention, but taken along two radii, as indicated by the section line 1—1 in Fig. 2, so that the upper half is a combined elevation and section and the lower half is a combined plan view and section.

Figure 1:
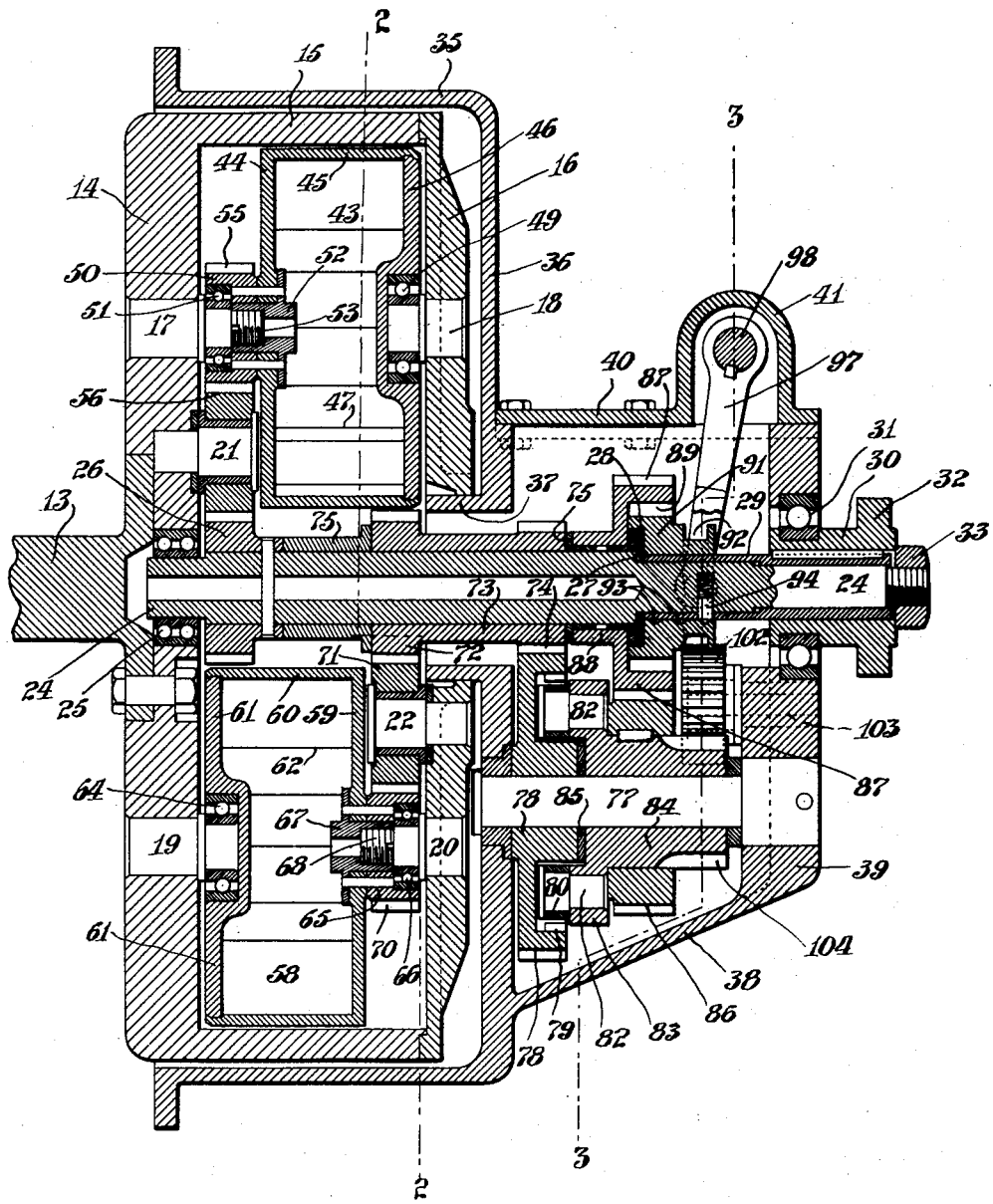

The mechanical elements will first be described and subsequently the method of transmission and mode of operation involved.

It will be convenient first to describe the driving parts, including the engine shaft and elements turning with it, then the driven shaft and elements turning with it, then the stationary parts including the housing, and finally the various intermediate parts and transmitting means.

The driving shaft 13 may be that of an internal combustion engine, and it is shown as carrying a circular disk or rotary support 14 which may be considered as part of a fly wheel, since a fly wheel effect is attained by this element and the parts carried by it. These parts include a cylindrical rim 15 and a circular cover plate 16, enclosing the hollow interior of the fly wheel or transmission. Other driving parts comprise the studs 17 and 18 for the main transmission devices or carriers, and the studs 19 and 20 for the supplemental devices or carriers; the studs 17 and 19 being secured to the disk 14 and the studs 18 and 20 to the cover plate 16. The disk 14 also supports studs 21, forming bearings for pinions cooperating with the main devices, while the cover plate 16 carries similar studs 22 for the supplemental devices.

The driven parts comprise the driven shaft 24 with which turn the following parts, beginning at the left end in Fig. 1. A bearing 25 is interposed between the driven shaft and the fly wheel disk 14. A central pinion 26 is pinned to the driven shaft. To the right of it are certain parts turning loosely, to be later described. The shaft is formed with a shoulder 27 against which is positioned a washer 28. The right hand end of the driven shaft is surrounded by a squared sleeve 29 pinned to the shaft. A collar or hub 30 is keyed to the sleeve 29, and carries a ball bearing 31 and a flange or enlargement 32, which may be part of a universal joint or other connection to the vehicle wheels. A nut 33 at the end of the shaft 24 secures the described parts in position.

The stationary elements shown in the drawings hereof comprise a cylindrical housing 35 having at its rear face a circular wall 36, the central portion of which is open to accommodate the driven parts, and the wall having a leftward flange 37. The housing has a rearward extension 38 and at the rear end an upright wall 39, cut away axially and giving support to the bearing 31. The extention housing is open above and provided with a removable cover plate 40, formed with a recessed extension 41 accommodating the shaft of the control means to be described.

The remainder of the description will deal first with the main transmission devices, shown specifically in the form of planetating carriers, as in said copending applications and then the supplemental transmission devices, also shown as planetating carriers, and finally a device for effecting the reversal of the direction of drive at will, through pedal or manual control. Pursuant to the present invention the main transmission device, or devices, as there may be more than one, are in operating effect at the higher ratios, operating up to full speed or unit ratio, while at lower ratios the supplemental transmission devices are operative to enhance the delivered torque or supplement the action of the main devices. When the load is small and the driven speed high the main devices will be sufficient, but with heavy loads and low ratio it may be that the torque will sometimes be insufficient without some auxiliary expedient or means. A speed reducing gear, connected at will, would give the desired power but this would be objectionable for obvious reasons, and non-automatic. With the present invention the required increase of torque is automatically effected by the coming into operation of the supplemental transmission means or devices, which may be inoperative or ineffective at the higher ratios, but become operative at a predetermined ratio as the load slows down the driven shaft. The principle thus set forth is believed to be new, and obviously the throwing in of supplemental transmission devices could be progressive, the main devices alone acting at the higher ratios, the second or supplemental devices at certain lower ratios, and still further devices at yet lower ratios. The advantage of more effective drive where high torque is required is thus secured without impairing the automatic character of the mechanism.

Figure 2:
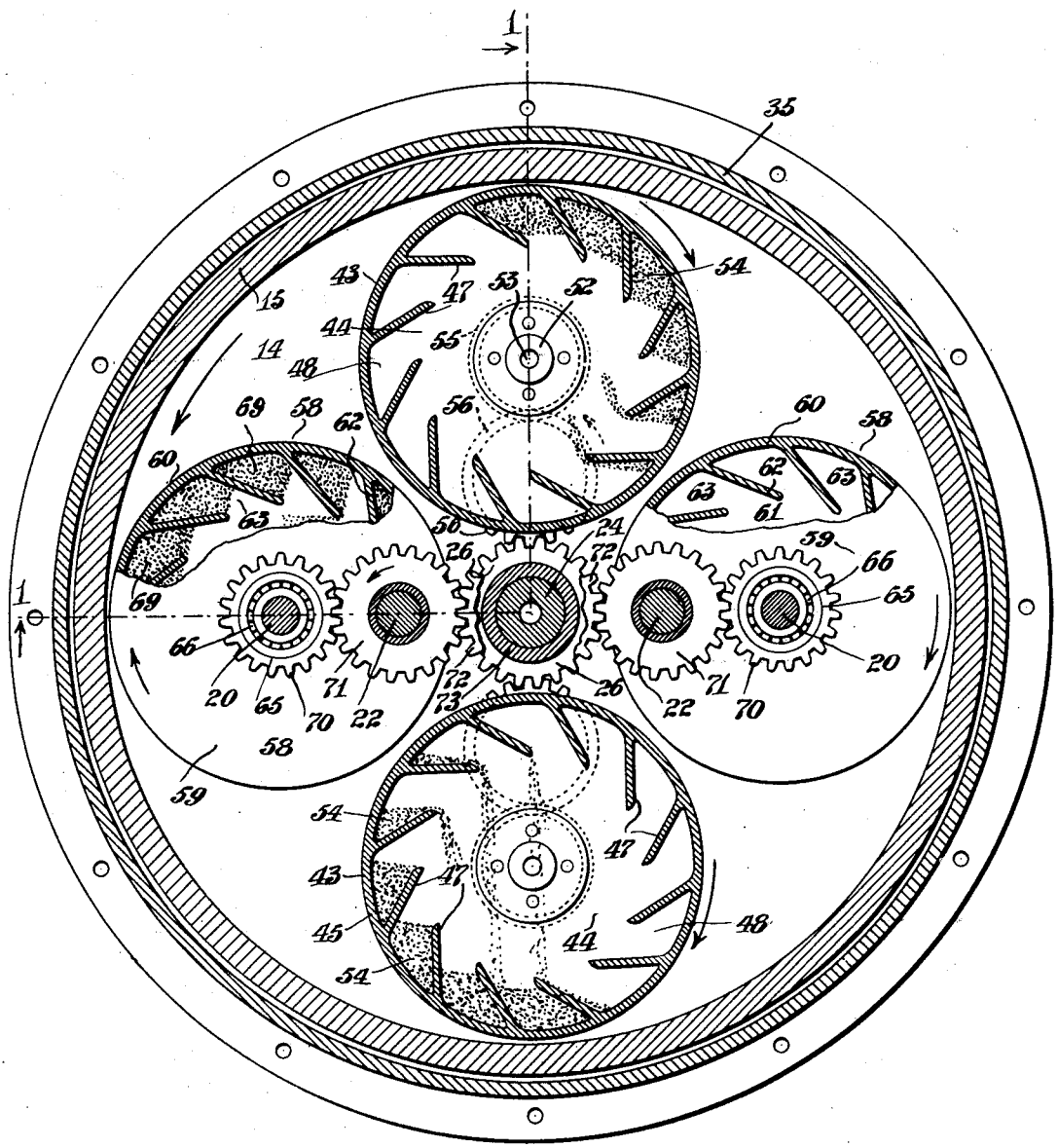
Fig. 2 is a transverse section taken substantially along the line 2—2 of Fig. 1, but elsewhere broken away to show more fully the internal structure.

The main transmission means may consist of one or more devices or transmitting connections between the driving and driven shafts, two being shown. These are actuable devices, caused to travel around an orbit by the power of the driving shaft, and actuated by connections from the driven shaft at a rate depending at any time on the difference in speeds of the shafts, the actuation ceasing with a ratio of one to one; and each device or carrier cooperates with a centrifugal mass or masses, energized with centrifugal force by the rotation of the driving shaft, and cooperating with the devices or carriers to deliver the requisite torque to the driven shaft. For purposes of illustration planetating carriers 43 are employed, these being the uppermost and lowermost of the carriers as seen in Fig. 2, the remaining carriers 58 being the supplemental ones already referred to.

Each of the main planetating carriers 43 is shown composed of a circular wall 44 extended as a cylindrical wall 45, forming a hollow interior which is closed by circular cover plate 46. The interior may be formed with vanes 47 slanting in a direction to form pockets 48 capable of picking up, holding and bodily carrying masses or mass portions. These parts may be constructed of a light strong metal such as duralumin, and the cylindrical portion may be spun over the cover plate as shown to form a permanently tight enclosure.

Each main carrier may be mounted as follows. The cover wall 46 is shaped and recessed to receive a bearing 49, the inner portion of which is supported on the stud 18, rigid with the driving parts. The circular wall 44 has pinned to it a hub 50 between which and the stud 17 is a bearing 51. An apertured member or sleeve 52 is shown attached centrally to the wall 44, this permitting masses or weights to be introduced into the carrier; and a screw plug or stopper 53 may be employed to close the same.

The centrifugal mass or masses 54 are preferably of a fluent nature, such as white lead, in oil, with some mercury added, or other flowing mass of heavy specific gravity, such as mercury. The quantity of mass may be varied, and may be such as is indicated in Fig. 2. It will be understood that each pocket 48 receives and picks up a portion of mass and holds and carries it bodily from an outward to an inward position in opposition to the high centrifugal force existing in the mass, so that the centrifugal force is received by or applied to the vanes or pockets in a manner to retard the planetation of the carrier, and thereby transmit power to the driven shaft through the connections to be described, each mass portion being released or discharged from its pocket at an inward position to return outwardly for repetition of action.

The connections for actuating or planetating the carriers may be of various sorts but it is preferred to rotate each carrier in a direction opposite to its revolution about the general axis. This arrangement may be effected by means of gear teeth 55 on the hub 50 of the carrier 43, constituting a planetating gear, which is shown engaged by an idler pinion 56 mounted loosely on the stud 21 and in turn engaging the central gear 26 fast on the driven shaft. When the driving shaft and fly wheel are turning counterclockwise, as indicated by the large arrow in Fig. 2, the carriers 43 are thus being rotated clockwise as indicated by the small arrows. This is assuming a condition in which there is substantial load on the driven shaft, with a difference in speeds of the driving and driven shafts, and a ratio less than unity, so that the carriers are under constant planetation. As already stated the internal play of the parts will cease when the conditions are such that the driven shaft may be rotated at the full speed of the driving shaft. It may be here stated that the drawings show the parts in the condition that they would present when the ratio is quite low and the delivered torque high, so that not only the main carriers, but the supplemental carriers are in effective action.

Figure 3:
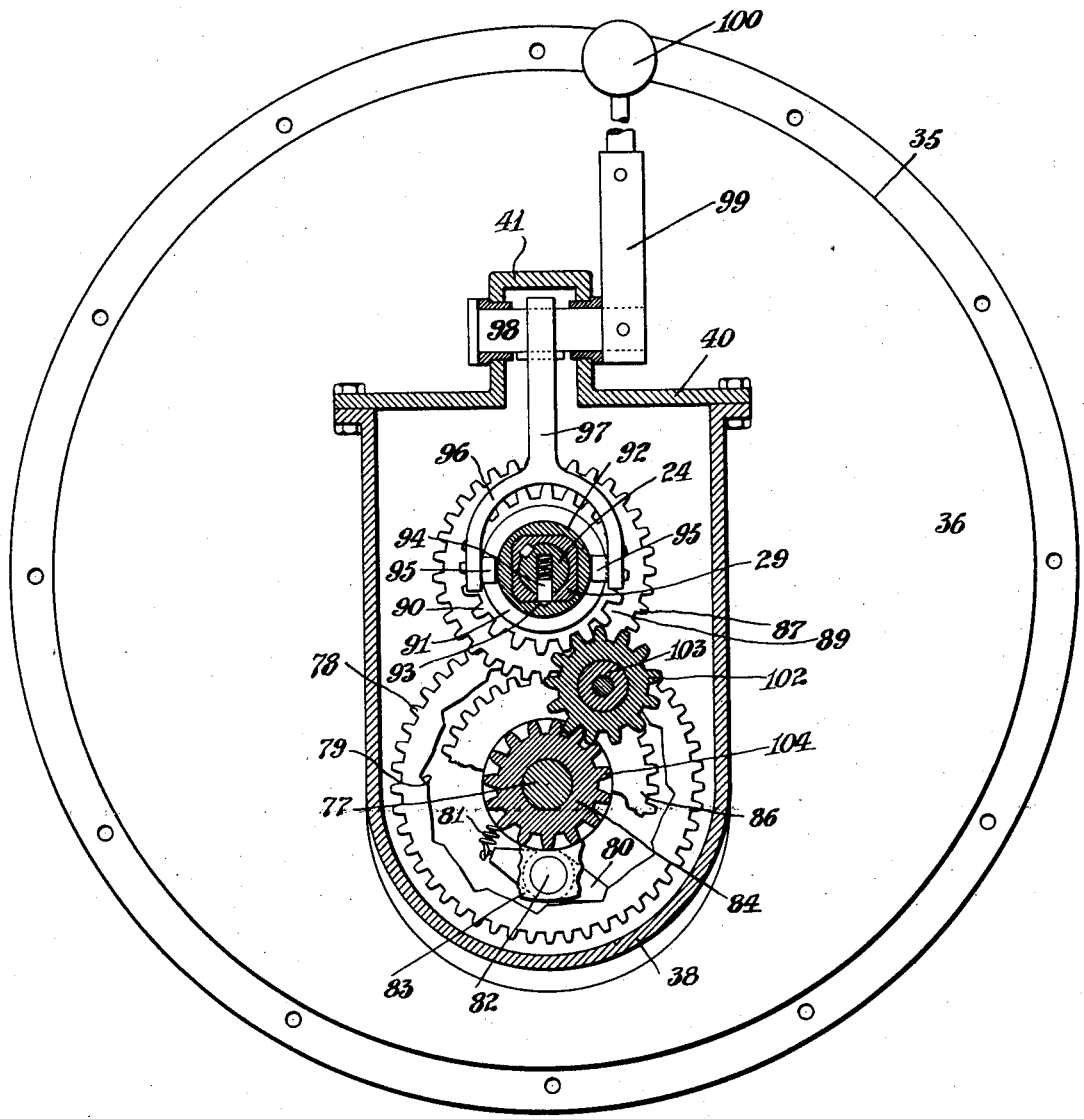
Fig. 3 is a transverse section taken along the line 3—3 of Fig. 1.

While the supplemental carriers may be more than two in number, the principle is adequately illustrated by showing two, arranged to act in unison, to supplement the delivered torque when the ratio is low. Like the main carriers 43 the supplemental carriers 58 are preferably arranged in diametrical opposition, for the sake of balance. Each supplemental carrier may be substantially identical in construction with the main carriers, being composed of circular and cylindrical walls 59 and 60 and cover plate 61, with interior vanes 62 forming pockets 63. The cover plate may contain a bearing 64 between it and the stud 19, while the wall 59 may have an attached hub 65 with a bearing 66 between it and the stud 20. The wall 59 may also have a central sleeve 67 through which the fluent mass may be introduced, and a stopper or screw plug 68 to close it. Centrifugal masses 69 may consist of fluent material. The hub 65 may be formed with teeth 70 constituting a planet gear which is engaged by an idler 71 loose on the stud 22 and engaging a central gear 72, by which the supplemental carrier is planetated. This central gear however is not on the driven shaft as in the case of gear 26, but is on a sleeve 73 which is loose on the driven shaft and has a second central gear 74 at its outer or right hand end. The sleeve 73 is held in its axial position by spacers 75. The central gear 74 on the sleeve 73 has only indirect connection with the driven shaft, namely by connections which include reduction gearing, giving increase of power, and including also a one-way device, or pawl and ratchet, by which the connections automatically become inoperative at high ratios and operative at low ratios. These connections are accommodated in the lower part of the supplemental casing 38, as seen in Figs. 1 and 3, the casing walls 36 and 39 giving support to a longitudinal stud or axle 77 on which some of the parts to be described are mounted.

The connections through which the supplemental carriers are planetated include the planet gears 70 thereon, the idler pinions 71, and the central gear 72 on the sleeve 73, which has the second central gear 74, already described, and the following further connections. The central gear 74 is engaged by a gear 78 rotating loosely on the axle 77 within the housing 38. Between the gear 78 and the next element is a one-way device or pawl and ratchet, the gear being shown formed with an internal ratchet 79 engaged by a plurality of pawls 80, which are pressed by springs 81, and are mounted on studs 82 extending leftward from the annular extension 83 of a rotary cylinder or hub 84 also loose on the axle 77. Under conditions of low ratio the pawls act constantly upon the ratchet, as indicated in Fig. 3, whereas at high ratios the pawl becomes ineffective, as will be described. Between the gear 78 and hub 84 is shown a washer 85, facilitating relative rotation. Keyed to the hub 84 is a gear 86 which is smaller than gear 78, and the gear 86 is in mesh with a central gear 87 of larger diameter than the central gear 74. The central gear 87 has a hub 88 surrounding the driven shaft and loose thereon, but normally locked to the driven shaft through a set of internal clutch teeth 89 on the member 87, engaging with clutch teeth 90 on a clutch member 91. This clutch member is formed with a square aperture fitting the squared sleeve 29 keyed to the driven shaft, so that the clutch member is compelled to rotate with the driven shaft, but may slide axially thereon. In the position shown the clutch member 91 has its teeth 90 engaged with the internal teeth 89 of the central gear 87, so that the latter is substantially a part of the driven shaft. The clutch member may be adjusted toward the right so as to disengage the teeth 89 and 90. For this purpose the clutch member has an annular groove 92 engageable by the shifting means. The clutch member has also three shallow notches 93 engageable by a spring pin 94 mounted in a radial recess in the driven shaft, and holding the clutch member yieldingly in any adjustment. The clutch member groove 92 is engaged by rolls 95 mounted on the arms of a yoke 96 which in turn is at the extremity of a lever 97 keyed to a short shaft or stud 98 mounted in the stationary cover plate 40. The exterior end of the shaft 98 is provided with a lever 99 having a handle or pedal 100 at its extremity. By shifting the handle the clutch member can be thrown to one or the other of its extreme positions, or to an intermediate position, as determined by the three notches 93 engaging the spring pin 94. The parts are shown with the clutch member in its leftmost position, as stated, so that the central gear 98 is substantially rigid with the driven shaft. The operation under the described adjustment will be explained subsequently.

When the clutch member 91 is thrown fully to the right its teeth 90 disengage the gear member 87 and come into mesh with the teeth of an idler pinion 102 mounted on a short fixed shaft 103, this pinion in turn meshing with teeth 104 formed on the hub 84. With this adjustment the driven shaft and the hub 84 will turn in the same direction, whereas with the previous adjustment they will turn in opposite directions. When the clutch member is set to its middle position its teeth engage both the gear member 87 and the idler pinion 102, preventing all rotation of these parts and the driven shaft.

As the parts are shown in the drawings the power of the engine shaft 13 is being transmitted at low ratio, with high torque delivered to the driven shaft 24. As seen in Fig. 2 the driving members including the fly wheel are rotating bodily in counterclockwise direction at the speed of the engine. The driven shaft and connected parts are supposed to be rotating in the same counterclockwise direction, but at low speed, or they might be considered as held against rotation by a very excessive load. In either case all of the carriers will be rotated in clockwise direction as indicated in Fig. 2 and will operate continuously to force the centrifugal mass portions inwardly in opposition to their centrifugal force, and release them to return outwardly for repetition of action. Referring first to the main carriers 43 these are planetated through their gears 55 meshing with the idler pinions 56 traveling around the driven shaft central gear 26. The centrifugal force in the mass portions, pressing outwardly against the buckets or holding means 48 or 47 applies a constant retarding pressure, which will be of high magnitude at high driving shaft speeds and will deliver high torque at the high speeds of planetation of the carriers which correspond with the lower speeds of the driven shaft. The centrifugal pressure is thus applied as a live force which is transmitted through each carrier and the gear trains 55, 56, 26 to deliver rotary pressure upon the driven shaft.

Referring to the operation of the supplemental carriers 58 this is analogous to the operation of the other carriers as described with the exception of the differences due to the different connections for driving the carriers. The main carriers are constantly rotated at a speed corresponding with the difference in speeds of the driving and driven shafts, namely through the planet gear 55, pinion 56 and central gear 26. The supplemental carriers however are not always operatively connected with the driven shaft and when connected are actuated only through the reduction gears 74, 78, 86, 87. The planet gear 70 meshes with idler pinion 71 which engages central gear 72 on sleeve 73. If the sleeve 73 were held stationary, or permitted to turn slower than the driving shaft, this would effect the planetation of the supplemental carriers, and this occurs at low ratios, as stated. Under such conditions the gear 78, loose on the counteraxle 77, is operatively connected or clutched with the smaller gear 86 on the hub 84, also loose on the axle 77. This operative connection is due to the fact that the pawl 80 bears constantly against a tooth of the ratchet 79, the pawl being carried by the hub 84 and the ratchet by the gear 78. The gear 86 on the hub engages the central gear 87 which, in the adjustment shown, is locked to the driven shaft, while the gear 78 is in mesh with the smaller diameter central gear 74 on the sleeve 73 which in turn is in gear with the supplemental carrier. It follows that when the shaft is held stationary, or allowed to turn slowly, it operates through the gear 87 to oppose resistance to the rotation of gear 86, the force of which resistance is transmitted through the gears 78, 74, 72, 71 and 70 to compel the rotation of the carrier 58. The centrifugal force tending to resist the planetation of the carrier is transmitted as a pressure in a clockwise direction in the gear 78, which is opposed by the counterpressure of the pawl 80 against the ratchet teeth within the gear. At low ratios therefore the carrier 58 is under constant planetation.

The result of the difference in diameters of the gears 86 and 78 engaging respectively the central gears 87 on the driven shaft and 74 on the sleeve 73 is that the sleeve 73 will rotate counterclockwise at a higher speed than the driven shaft; wherefore the supplemental carriers will planetate at a speed lower than the main carriers. As the relative speed of the driven shaft increases, the speed of planetation of the main carriers will correspondingly decrease, and will become zero when the driving and driven shafts turn at the same speed, giving unit ratio where permissible by conditions of power and load.

In the case of the supplemental carriers however the sleeve 73, traveling always at a multiplied speed, will attain the speed of the driving shaft while the ratio is still low. In other words the supplemental carriers will cease planetating at an intermediate speed ratio, for example when the driven shaft is turning at half the speed of the driving shaft. When the speed ratio is higher than this the supplemental carriers become inoperative. The ratchet 79 will travel slower than the pawl 80. There will be effective unclutching or disengagement between the supplemental carrier and the driven shaft. The carrier will therefore cease planetating and will assume a position in which the centrifugal masses, or their center of gravity, is at an outward point.

This structure and operation meets the specific objects as already stated. The main carriers 43, 43 are operative to transmit power at speeds varying from unit ratio downwardly, and they take care of the ordinary requirements of a motor vehicle; but when the speed ratio drops below a predetermined point, due to excessive load, such as a steep upgrade, the slowing of the driven shaft brings into operative effect the train of mechanism which actuates the supplemental carriers. The pawl and ratchet 80, 79 becomes effective and the two supplemental carriers are planetated, thus adding their transmitting effect to that of the main carriers, in a degree increasing rapidly as the speed ratio approaches zero. The coming into action of the supplemental carriers is seen to be wholly automatic and it supplies a need existing under conditions of heavy load. With a quite low ratio, due to a heavy load, the supplemental carriers will more than double the driving effect due to the main carrier and the increase may be greater with proper changes in proportion. The multiplied torque in the supplemental system is due in part to the fact that the reduction gearing 74, 78, 86, 87 gives increased leverage, and due further to the fact that preferably the supplemental carriers 58 are provided with a greater quantity of centrifugal mass or flowing material than the main carriers, as indicated.

A convenient mode of securing reverse direction of drive of the driven shaft will now be described. It has already been explained that at low speed ratios the supplemental carriers 58 deliver greater torque than the main carriers 43. If a reversing gear be interposed between the supplemental carriers and the driven shaft it will therefore be possible to drive the latter in the reverse direction. This is accomplished by the idler pinion 102 when the clutch member 91 is thrown from the Fig. 1 position to the opposite extreme position, which adjustment disengages the clutch member from the gear 87, rendering the latter inoperative. The teeth 90 on the clutch member 91 constitute a gear and when the clutch member is shifted these teeth will engage the idler pinion 102, which transmits the rotation to the hub member 84 through the teeth 104 on the latter. The idler pinion reverses the relative directions, so that the driven shaft will turn clockwise in Figs. 2 and 3. The superior transmitting effect of the supplemental carriers overcomes that of the main carriers, and the driven shaft is thus turned reversely. The power moreover is further increased by the fact that the gear 89, part of the clutch member, is of greater diameter than the gear 104. The ratio therefore of these two gears is greater than the ratio of the gears 87 and 86, which are shown about of equal diameter, so that when the reverse connection is in effect the drive is through a greater gear reduction, resulting in an increased torque transmission.

When the clutch member 91 is in its middle position its teeth 89 engage both the gear 87 and the pinion 102 as stated, which effectually locks the driven shaft and the hub 84 against rotation.

It will thus be seen that power transmission apparatus and method have been described, embodying the principles and attaining the objects of the present invention; and since many matters of operation, arrangement, combination, structure and design may be variously modified without departing from the novel principles, it is not intended to limit the invention to such matters except so far as specified in the appended claims.

What is claimed is:

1. Power transmission apparatus comprising the driving and driven members, a main self-adjusting transmitting mechanism between the driving and driven members, operating both at the higher and lower transmitted speeds, and a normally inoperative supplemental transmitting mechanism between the driving and driven members, the same comprising a one-way device causing it to become operative only at the lower relative transmitted speeds, whereby with high loads both transmitting mechanisms deliver torque cooperatively at low speed to the driven member.

2. In power transmission apparatus, the driving and driven members, a first transmitting means between the driving and driven members comprising a carrier revolved bodily around an orbit by the power of the driving member, and having connections from the driven member causing its actuation at a rate corresponding with the existing speed difference of the members, and a mass cooperating with said carrier and adapted to apply its centrifugal force as a thrusting pressure resisting the actuation of the carrier and thereby transmitted as torque to the driven member; a second transmitting means between the driving and driven members not effectively operative at high ratio; and means causing the second means to come automatically into transmitting operation as the ratio is reduced below a predetermined point.

3. In power transmission apparatus, the driving and driven members, a first transmitting means between the driving and driven members comprising a carrier revolved bodily around an orbit by the power of the driving member, and having connections from the driven member causing its actuation at a rate corresponding with the existing speed difference of the members, and a mass cooperating with said carrier and adapted to apply its centrifugal force as a thrusting pressure resisting the actuation of the carrier and thereby transmitted as torque to the driven member; and a supplemental transmitting means between the driving and driven members comprising a carrier revolved bodily around an orbit and having connections operative from the driven member when the speed ratio is low for causing the supplemental carrier's actuation, and a centrifugal mass cooperating with said supplemental carrier.

4. Power transmission apparatus comprising the driving and driven members and between them a progressively variable transmitting mechanism delivering lower relative driven speeds upon increase of load and vice versa, in combination with a normally inoperative supplemental transmitting means between the driving and driven members, having a device causing it to become operative at the lower relative driven speeds and thereby, in cooperation with the main mechanism, to transmit increased torque with high loads.

5. Apparatus as in claim 4 and wherein one of said transmitting means comprises a centrifugal mass and cooperating carrier, the carrier adapted to engage, hold, convey inward and release the mass, and being mounted to be moved bodily around by the driving member and having connection from the driven member for actuating it.

6. Apparatus as in claim 4 and wherein each of said transmitting means comprises a carrier mounted to be moved around an orbit by the driving member and having connection from the driven member for actuating it and having a succession of holders or pockets, and a plurality of mass portions adapted to be conveyed inwardly in succession by such holders and released.

7. Power transmission apparatus comprising the driving and driven members and between them a main transmitting mechanism wherein is a movable mass carried by the driving member, and connections from the driven member to the mass for actuating it to move inwardly and outwardly, whereby are delivered lower relative driven speeds upon increase of load and vice versa, in combination with a supplemental transmitting means between the driving and driven members, comprising a centrifugal mass and a carrier mounted to be moved around an orbit by the driving member, the carrier adapted to engage, convey inwardly and release the mass, and having connections from the driven member for actuating it, and means causing the supplemental mechanism to become inoperative at the higher and operative at the lower relative driven speeds.

8. Apparatus as in claim 7 and wherein the means causing the supplemental mechanism to become inoperative at the higher speeds comprises a one-way device associated with the connections from the driven member to the carrier.

9. Apparatus as in claim 7 and wherein the connections between the driven member and carrier comprise a gear on the carrier, a central gear on the driven shaft, and gearing between said gears including a one-way device, arranged to permit the driven shaft to overrun the supplemental mechanism at the higher relative driven speeds.

10. Power transmission apparatus comprising the driving and driven members and between them a main transmitting mechanism wherein is a movable mass carried by the driving member, and connections from the driven member to the mass for actuating it to move inwardly and outwardly, whereby are delivered lower relative driven speeds upon increase of load and vice versa, in combination with a supplemental transmitting means between the driving and driven members, comprising a planetating carrier revolved by the driving member, and having connections from the driven member for rotating it, and having a succession of holders, and a plurality of mass portions adapted to be successively engaged, thrust inwardly and released by such holders, whereby the centrifugal force of said mass portions is delivered as continuous one-way torque to the driven member, and means causing the supplemental mechanism to become inoperative at the higher and operative at the lower relative driven speeds.

11. Apparatus as in claim 10 and wherein the mass holders on said carrier are in an endless series, whereby the mass portions are moved inwardly in a train or procession, and are released to return outwardly for repeated cooperation with the several holders.

12. Apparatus as in claim 10 and wherein the carrier rotating connections comprise a planet gear on the carrier, a loose central gear driving said planet gear, a second central gear turning with the first, a gear meshing with said second central gear and turning about a counter-axis, a second counter-gear turning about said counter-axis, a one-way device between said two counter-gears, and a third central gear turning with the driven member and in mesh with said second counter-gear.

13. Apparatus as in claim 10 and wherein the carrier rotating connections comprise a planet gear on the carrier, a loose central gear driving said planet gear, a second central gear turning with the first, a gear meshing with said second central gear and turning about a counter-axis, a second counter-gear turning about said counter-axis, a one-way device between said two counter-gears, and a third central gear turning with the driven member and in mesh with said second counter-gear; said first counter-gear being of greater pitch diameter than the second, and said third central gear being of greater pitch diameter than the second.

14. Apparatus as in claim 10 and wherein the carrier rotating connections comprise a planet gear on the carrier, a loose central gear driving said planet gear, a second central gear turning with the first, a gear meshing with said second central gear and turning about a counter-axis, a second counter-gear turning about said counter-axis, a one-way device between said two counter-gears, and a third central gear turning with the driven member and in mesh with said second counter-gear; and reversing means comprising a third counter-gear turning with the second counter-gear, an idler gear meshing said third counter-gear, a central gear on the driven shaft, and clutch means for throwing the two last mentioned gears into mesh and disengaging the connections between the second counter-gear and driven shaft.

In testimony whereof, we have affixed our signatures hereto.

JOHN REECE.
FRANKLIN A. REECE.